United States Patent
Wieneke

(10) Patent No.: US 10,943,369 B2
(45) Date of Patent: Mar. 9, 2021

(54) METHOD FOR CALIBRATING AN OPTICAL MEASUREMENT SET-UP

(71) Applicant: LaVision GmbH, Goettingen (DE)

(72) Inventor: Bernhard Wieneke, Goettingen (DE)

(73) Assignee: LAVISION GMBH

( * ) Notice: Subject to any disclaimer, the term of this patent is extended or adjusted under 35 U.S.C. 154(b) by 0 days.

(21) Appl. No.: 16/612,797

(22) PCT Filed: May 9, 2018

(86) PCT No.: PCT/EP2018/062098
§ 371 (c)(1),
(2) Date: Nov. 12, 2019

(87) PCT Pub. No.: WO2018/210672
PCT Pub. Date: Nov. 22, 2018

(65) Prior Publication Data
US 2020/0202572 A1    Jun. 25, 2020

(30) Foreign Application Priority Data

May 15, 2017   (DE) .......................... 10 2017 110 533

(51) Int. Cl.
*G06T 7/80*    (2017.01)
*G06T 7/32*    (2017.01)
(Continued)

(52) U.S. Cl.
CPC ................. *G06T 7/85* (2017.01); *G01P 5/20* (2013.01); *G06T 7/11* (2017.01); *G06T 7/32* (2017.01); *G06T 2207/20021* (2013.01)

(58) Field of Classification Search
CPC .... G01P 5/20; G06T 2207/20021; G06T 7/11; G06T 7/32; G06T 7/85
See application file for complete search history.

(56) References Cited

U.S. PATENT DOCUMENTS

2004/0183909 A1   9/2004  Wieneke
2008/0123939 A1   5/2008  Wieneke

FOREIGN PATENT DOCUMENTS

| DE | 103 12 696 | 12/2004 |
|----|------------|---------|
| EP | 1 926 049  | 10/2010 |
| EP | 1 460 433  | 2/2012  |

OTHER PUBLICATIONS

International Preliminary Report on Patentability.
(Continued)

*Primary Examiner* — Farzana Hossain
(74) *Attorney, Agent, or Firm* — Gerald E. Hespos; Michael J. Porco; Matthew T. Hespos

(57) ABSTRACT

A method calibrates an optical measurement set-up with a measurement volume seeded with particles and at least two cameras so that the measurement volume can be mapped from different observation angles. The method includes simultaneously mapping the measurement volume by the cameras to produce images; rectifying each camera image in relation to a common reference plane in the measurement volume by using the respective pre-calibrated mapping function; performing two-dimensional correlation for at least one pair of rectified camera images to produce correlation fields that present an elongate correlation maxima band for each correlation field; reducing the correlation maxima band to a straight line representing the band; determining the distance of this representative straight line from the coordinate origin of the correlation field as a correction value, using the determined correction values to correct the mapping functions of those cameras for which rectified camera images were included in the correlations.

8 Claims, 2 Drawing Sheets

(51) Int. Cl.
　　　*G06T 7/11*　　　(2017.01)
　　　*G01P 5/20*　　　(2006.01)

(56) References Cited

OTHER PUBLICATIONS

B. Wieneke, "Stereo-PIV using self-calibration on particle images", Experiments in Fluids, Experimental methods and their applications to fluid flow—Aug. 2005; pp. 267-280.
International Search Report dated Aug. 8, 2018.

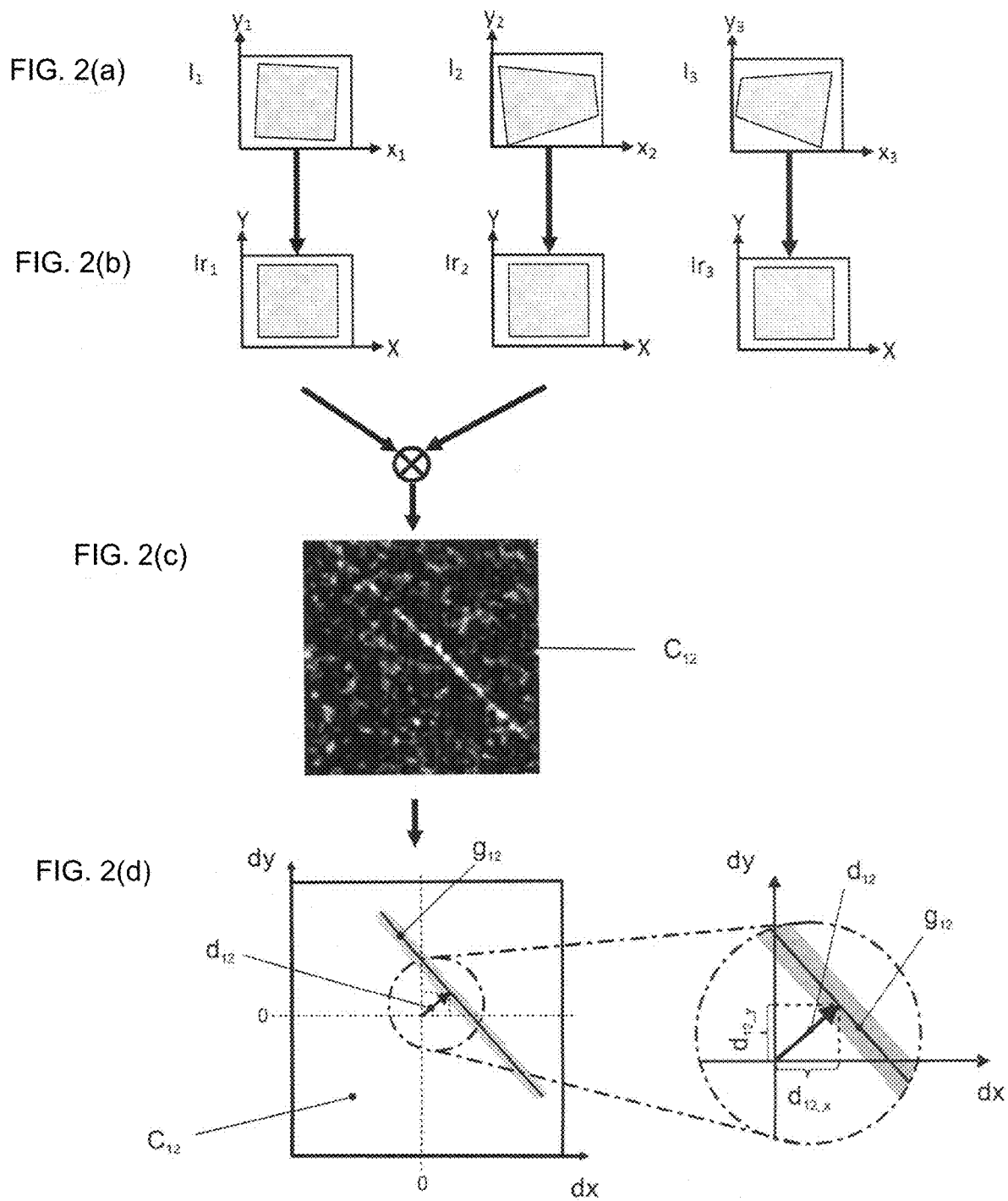

US 10,943,369 B2

METHOD FOR CALIBRATING AN OPTICAL MEASUREMENT SET-UP

BACKGROUND

Field of the Invention

The invention relates to a method for calibrating an optical measurement set-up.

Related Art

EP 1 926 049 B1 discloses a method for calibrating an optical measurement set-up with a measurement volume seeded with particles and with at least two cameras, by means of which the measurement volume can be mapped from different observation angles, in each case with a mapping function known from a pre-calibration. The method comprises simultaneously mapping the measurement volume by means of the cameras to produce a camera image for each camera.

For measurement of flows, seeding the flowing fluid with optically detectable particles and observing them by means of cameras is known. A measurement volume through which the fluid flows is observed by multiple cameras from different observation angles. In order to make precise statements about the details of the flow, it must be possible to precisely determine within the measurement volume the position of the particles that are regarded as representative for the flow. The stereoscopic approach outlined above, in which the particle positions in the measurement volume can be calculated based on camera images taken simultaneously from different angles, serves this purpose. Precise knowledge of the so-called mapping function of each camera is essential in this regard, i.e. the function that correlates a three-dimensional position within the measurement volume with the corresponding two-dimensional position in the camera image. The mapping function M can be written in a general form as $$\begin{pmatrix} x_i \\ y_i \end{pmatrix} = M_i(X, Y, Z) = \begin{pmatrix} M_{ix}(X, Y, Z) \\ M_{iy}(X, Y, Z) \end{pmatrix},$$

where the index i identifies a specific camera, x, y refers to the two-dimensional coordinates in the associated camera image, and X, Y, Z designates the spatial coordinates (also known as "global" coordinates) within the measurement volume.

The determination of these imaging functions is referred to as calibration.

From the above-mentioned EP 1 926 049 B1, a two-step calibration procedure is known. First, a pre-calibration is performed, typically by means of so-called calibration plates. In this regard, a structure with known markings is placed into the measurement volume and mapped by means of the cameras. By comparing the camera images with the known structure, the corresponding mapping functions can be calculated. This pre-calibration is relatively coarse, however, and in order to be suitable for certain precision measurements, requires an additional correction, i.e., changing the mapping function M into a corrected mapping function M'. The case also occurs that during the time between pre-calibration and the actual measurement, the optical structure changes, e.g., due to mechanical instabilities, or changes may occur in the mapping equation during the measurement, e.g., due to vibrations.

To correct the pre-calibrated mapping functions, EP 1 926 049 B1 suggests applying known triangulation methods. First, it is necessary to obtain images of a selected particle in all camera images. Then, by inverting the mapping function, the line of sight along which a particle could lie within the measurement volume is determined, in order have it imaged at the actual mapping position in the camera image (an unambiguous point correlation by inverting the mapping function is not possible due to the dimensional difference between the two-dimensional camera image and three-dimensional measurement volume). This is performed under the presumption that the mapping function is correct. In the case of mapping functions that have, in fact, been correctly determined, the sight lines of all cameras meet at a point in the measurement volume, namely the actual position of the particle, which is usually not the case following the coarse pre-calibration, however. EP 1 926 049 B1 therefore suggests presuming the point in the measurement volume with the shortest distance to all calculated sight lines as the "true" position of the particle and to use its distances from the sight lines to correct the respective mapping function. This is known as a volumetric self-calibration, since the calibration is corrected based on parameters derived from the measurement itself. Performing this self-calibration one or more times results in correct mapping functions.

With regard to the method of EP 1 926 049 B1, the necessity of unambiguously identifying the images of a particle within the measurement volume in all camera images and correlating them with one another is disadvantageous. This approach, which is successful with low particle concentrations, cannot be used with higher particle concentrations, especially since the number of so-called "ghost particles," i.e., apparent images in the camera images of particles that do not actually exist, increases disproportionately along with increase in particle concentration.

From image processing technology in general, dewarping of camera images, also termed rectification, is known. The latter term will also be used in the present document. The rectification of a camera image is always done in relation to a real or imagined plane in the observed volume, i.e., the measurement volume in the present case. Insofar as the optical axis of a camera does not align precisely with the central normal of the reference plane, geometric distortions in the image occur dependent on the specific observation angle. Optical distortions additionally occur due to the camera lens, which distortions, however, are largely negligible with a sufficiently good lens and a sufficiently small measurement volume. The distortions occurring during imaging are taken into account in the associated mapping function. Rectification describes a recalculation of the camera image that changes the acquired camera image such that it corresponds to the (virtual) image that would have been created if the camera had been located in its ideal orientation to the reference plane, described above, at the time at which the image was taken; however this only applies to the images of those particles that actually lie in the reference plane. For the particles located "in front of" or "behind" the reference plane, the rectification does not necessarily mean, due to parallax, that their rectified mapping position corresponds to the position obtained in an actual mapping with the camera ideally oriented. In the present context, the interrelationships known to one skilled in the art according to which, on the one hand, the rectification is always performed in relation to a specially selected reference plane and, on the other hand, the mapping functions are incorporated into the rectification, are essential.

As an example of a rectification, the calculation for the Z=0 plane and for Camera 1 is given here. In the example, the intensity of each point (or pixel) at the position (X, Y, Z=0) in the dewarped image is given by the spatially corresponding intensity in the original camera image:

$$Ir_1(X,Y)=I_1(x_1,y_1)=I_1(M_{1x}(X,Y,Z=0),M_{1y}(X,Y,Z=0)).$$

Please note that the coordinates X and Y are the same "global" coordinates X and Y that also serve to determine a spatial position (X, Y, Z) in the measurement volume. The rectification therefore constitutes a transformation of the camera image coordinates x, y into the "global" coordinates X, Y.

Furthermore, from EP 1 460 433 B1 the calculation of two-dimensional correlations between camera images is known. By means of the method disclosed in EP 1 460 433 B1, which method is only applicable to measurement volumes defined by a so-called light section in the form of thin slices and fails in the case of three-dimensionally extended measurement volumes, the camera images taken from different observation angles are correlated to one another one interrogation field at a time, which results in a correlation peak in each interrogation field. Its distance from the coordinate origin of the correlation interrogation field is taken as a measure for a correction of the mapping function in the region of the slice-shaped measurement volume represented by the interrogation field.

The problem that the present invention seeks to solve is to propose an alternative method to the generic self-calibration method that is suitable especially for higher particle concentrations in three-dimensionally extended measurement volumes.

SUMMARY

The invention relates to method for calibrating an optical measurement set-up with a measurement volume seeded with particles and with at least two cameras, by means of which the measurement volume can be mapped from different observation angles, in each case with a mapping function known from a pre-calibration. The method comprises:
a) simultaneously mapping the measurement volume by means of the cameras to produce a camera image for each camera
b) rectifying each camera image in relation to a common reference plane in the measurement volume with use of the associated, pre-calibrated mapping function,
c) performing a two-dimensional correlation for at least one pair of rectified camera images in order to produce a corresponding number of correlation fields, wherein each correlation field presents an elongate correlation maxima band,
d) for each correlation field:
d1) reducing the correlation maxima band to a straight line representative of this band,
d2) determining the distance of this representative straight line from the coordinate origin of the correlation field as a correction value,
e) using the determined correction values to correct the mapping functions of those cameras for which rectified camera images were included in the correlations in Step c.

First a common reference plane for all cameras is selected. It is expedient for this to be located centrally within the measurement volume. The specific choice is, however, irrelevant with regard to the basic functional principle of the invention. It is favorable to define Z=0 for it. Then each camera image taken is rectified in relation to this common reference plane, as is essentially known to one skilled in the art. As explained at the outset, the current mapping functions are incorporated into the rectification, such that the rectified images implicitly contain the information regarding the mapping functions to be checked and corrected by means of the method according to the invention without there being any need for an identification of correlated particle images and a subsequent explicit triangulation, as is the case in the prior art according to EP 1 926 049 B1. As such, the rectified camera images $Ir_i$ result from the camera images $I_i$.

Then, a two-dimensional correlation is performed between each of two rectified camera images, as is also essentially known to one skilled in the art. Correlation here is understood generally to mean a similarity operator and/or its application. It is especially advantageous to use the standard cross-correlation in the general form $$C_{ij}(dx,dy)=\Sigma_{x,y}Ir_i(X,Y)Ir_j(X+dx,Y+dy)$$

which is termed "cross-correlation" here for short. One skilled in the art is aware of comparable functions, such as LSM (least-square-matching) or ZNSSD (zero-averaged normalized sum-of-square-differences), which can also be used in addition to others as similarity operators in the context of the present invention. The concept of the correlation maximum should be understood accordingly as a relative displacement of the images correlated with one another (a point in the correlation field), which results in especially strong conformity among the images correlated with one another, compared to adjacent relative displacements. When a cross-correlation per the above formula is used, this is also connected with a (local) mathematical maximum value in the (cross) correlation field; when similarity operators based on minimization algorithms are used, mathematically corresponding (local) minima are obtained in the correlation field. Suitable image pre-processing steps that improve the quality of the correlation, such as subtracting the background intensity, are also known to one skilled in the art.

The correlation can be performed uniformly on the entire rectified camera image, or as preferably provided for, between individual interrogation fields associated with one another (more on this subject below). Every correlation performed produces a correlation field $C_{ij}$ that has a plurality of potentially overlapping correlation peaks. These arise through correlation of a particle image in the first image with a particle image in the second image. In this regard, the two particle images can be of the same particle in the volume (correct association) or can originate from two different particles (ghost particles and/or ghost correlations). Insofar as these correlation peaks derive from ghost particles, they are largely randomly distributed over the correlation field. Those correlation peaks that derive from real particles extend in a narrow, elongate band across the correlation field. The band's angle of extension relative to the coordinate system of the correlation field is essentially determined by the relative geometric arrangement of the cameras involved in the correlation and can be calculated based on the mapping function. The maximum length of the band is determined by the depth of the measurement volume and/or the length of the camera's line of sight within the measurement volume. Usually this length is further restricted by the size of the correlation fields. For example, with a correlation field size of 64×64 pixels (dx,dy<±32 pixels), the correlation band only shows the particle correlations in a small (Z) region around the reference plane. As discussed below, this enables the selective differing correction of the mapping equation for multiple planes within the measurement volume. The width of the band is essentially determined by the size of the particle images multiplied by √2. Conversely, the distance from the coordinate origin of the correlation field (dx=0, dy=0) is affected by inaccuracies in the mapping function used in the rectification. These relationships constitute the essential insights of the inventor, and their implementation into a practical calibration method constitutes the core of the present invention.

According to the invention, the recognized relationships are exploited by reducing the correlation maxima band to a representative straight line.

Then the distance $d_{ij}$ of the determined, representative line from the coordinate origin of the correlation field $C_{ij}$ is determined. In keeping with the usual definition of "distance", the perpendicular distance between the representative line and the coordinate origin is measured.

A simple method that combines the functional steps of the straight line determination and the determination of its distance from the coordinate origin into a single practical calculation step consists in summing the correlation intensities along the line direction for all distances d perpendicularly from the origin to the (known) line direction. The distance $d_{ij}$ of the line then corresponds to the distance with the maximum of the summed intensities. Other image processing methods as well as usual error square minimization methods are known in the technical field. With particle concentrations typical of flow measurements, it has been shown to be sufficient if all correlation values of the correlation field are incorporated into the calculation of the straight line. However, it is also conceivable to perform a pre-selection by applying an intensity threshold value and/or by not taking into account the correlation peaks positioned in the boundary regions of the correlation field. However, since the method according to the invention has shown itself to be surprisingly robust, such a pre-selection is not necessary in most cases.

Typically, the coordinate axes X, Y of the rectified camera images are divided into position units dimensioned as "pixels," which can be converted to a unit of length, such as mm, by scaling. The coordinate axes dx, dy of the correlation fields are therefore also typically divided into displacement units dimensioned as "pixels." In this context, the distance value between the representative straight line and coordinate origin is also given in the dimension of "pixels." Preferably the distance is determined vectorially, i.e. as a vector $d_{ij}$ extending from the coordinate origin, the direction of which vector is prescribed by its above-explained perpendicular position relative to the representative line and its length being prescribed by the above-explained distance value. This makes it possible to separately determine the distance components $d_{ij\_x}$ and $d_{ij\_y}$ parallel to the coordinate axes.

The determined distance is then used as a correction value for the mapping functions, specifically and respectively for the mapping functions of those cameras i and j, from which the rectified camera images, $Ir_i$ and $Ir_j$, are incorporated into the correlation $C_{ij}$ which produces the said correction value $d_{ij}$. The concrete correction measure applied to the mapping functions on the basis of the determined correction value can differ. In this connection, an advantageous correction rule has been shown to be a simple translation of the mapping equation, in which the corrected mapping equation M' is provided as $$M_i'(X,Y,Z)=M_i(X-\Delta X_i,Y-\Delta Y_i,Z-\Delta Z_i)$$

for each camera i. Therein the determined distances $d_{ij}$ have a known functional relationship with the translations that remain to be determined ($\Delta X_i$, $\Delta Y_i$, $\Delta Z_i$).

For the case of two cameras with a single calculated distance $d_{12}$, a simple solution can be arrived at through $\Delta X_1 = d_{12\_x}/2$, $\Delta Y_1 = d_{12\_y}/2$, $\Delta X_2 = -d_{12\_x}/2$, $\Delta Y_2 = -d_{12\_y}/2$, $\Delta Z_1 = \Delta Z_2 = 0$. For the case of three cameras with three measured distances $d_{12}$, $d_{13}$ and $d_{23}$, it is possible to take, for example, Camera 1 as a reference camera with $\Delta X_1 = \Delta Y_1 = \Delta Y_1 = 0$ as well as to calculate the six remaining unknowns ($\Delta X_2$, $\Delta Y_2$, $\Delta Z_2$, $\Delta X_3$, $\Delta Y_3$, $\Delta Z_3$) by including $\Sigma \Delta X_i = \Sigma \Delta Y_i = \Sigma \Delta Z_i = 0$ as three constraints. This is advantageous in order to minimize a potential coordinate transformation, since any displacement that is the same for all cameras ($\Delta X$, $\Delta Y$, $\Delta Z$) that corresponds to a translation of the coordinate origin is a free parameter that does not change the correlation fields and the measured distances $d_{ij}$, at least for displacements that are not too large. Advantageous solutions are also known to one skilled in the art for more than three cameras.

The invention therefore provides, for many cameras with high pixel resolution, a computationally intensive but easy to perform and surprisingly robust self-calibration method that takes into account the special aspects of high particle concentrations in real measurement volumes that extend by approximately the same order of magnitude in all three spatial directions.

As is evident from the above explanations, precisely one correction value $d_{ij}=(d_{ij\_x},d_{ij\_y})$. results for each correlation field. In the case that respectively complete, rectified camera images are correlated with one another, a single, global correction value therefore results. However, in many cases, locally differing corrections of the mapping function are required, if, as is usually the case, different regions of the measurement volume are imaged slightly differently. Therefore for refinement of the method according to the invention, it is provided that the rectified camera images before Step c are each divided into a plurality of equally sized and equally positioned interrogation fields, Steps c and d are performed on the interrogation fields, and the mapping functions in Step e are corrected in the various spatial regions of the measurement volume with the respectively associated, different correction values associated with the various interrogation fields. Instead of the single, global correction value for each pair of rectified camera images, a plurality of correction values corresponding to the number of interrogation fields is produced and the mapping function can be locally differently corrected with the spatial resolution of the interrogation fields. In an individual case, one skilled in the art will have to weigh the increased computational requirements, on the one hand, and the greater precision of the resulting mapping functions, on the other hand.

One skilled in the art will recognize that the previously explained division of the rectified camera images into interrogation fields merely results in a diversification of the mapping function correction within the selected reference plane. It is conceivable and common in practice, however, for deviations of the mapping function to arise that differ for the various reference planes within the measurement volume. In order to also obtain a differentiation of the mapping function correction, in this regard, it is provided in a further development of the invention that the method is performed multiple times, at least from Steps b to e. The camera images are rectified during each pass in Step b in relation to another common reference plane, and the mapping functions in Step e are each only corrected with the respectively determined correction value within the spatial region of the measurement volume that can be associated with the respective reference plane. In other words, the measurement volume is divided into layers by the selection of different reference planes, wherein the mapping functions are also corrected on a layer-by-layer basis. In combination with the previously explained interrogation field variant of the invention, the measurement volume is therefore subdivided into sub-volumes in all three spatial directions and a correction of the mapping functions that is correspondingly diversified in all three spatial directions is performed.

Another advantageous version of the method comprises calculating the correlation fields not only with the images that were taken at a single point in time, but rather, in calculating corresponding correlation fields for multiple points in time, and to sum them together, in order to obtain better statistics through more particles. In particular, this applies when the rectified image is still divided into multiple sub-regions. In a further development of the invention, it is therefore provided that the method according to the invention is performed multiple times, from Steps a to c, for multiple time points, each corresponding correlation field is summed with the others, and then Steps d and e are performed.

The method according to the invention reaches a limit, in principle, when a classical, stereoscopic structure of three cameras is involved, i.e., when the optical axes of all three cameras lie in the same plane, e.g., when all cameras are set up along a line. Such a configuration is also often termed an "inline" configuration.

With such a camera configuration, the representative straight lines in the correlation fields have the same angular position relative to their coordinate axes, such that although the mapping functions are improved, it cannot be expected that they will be optimized, i.e. that the above-mentioned equation systems can no longer be unambiguously solved. In particular, but not exclusively, to make this configuration work, the method according to the invention can be expanded. It is then a method, as described above, wherein the optical measurement structure has a first camera, a second camera and a third camera, and of their rectified camera images, only those from the first and second camera are incorporated into the correlation and correction of the mapping equation of Camera 1 and 2 in steps c to e, and that is characterized by the following, additional steps:

f) rectification
 of the camera images from the first and second camera, using the respectively associated mapping function that was corrected in Step e, and
 of the camera image from the third camera, using the associated, pre-calibrated mapping function in relation to a plurality of common parallel reference planes,
g) performing, for each reference plane, a two-dimensional correlation between the product of the rectified camera images from the first and second camera with the rectified camera image from the third camera, and summing the resulting correlation fields to obtain a sum correlation field,
h) determining the distance of the correlation maximum within the sum correlation field from the coordinate origin of the sum correlation field as an additional correction value,
i) correcting the mapping function of the third camera with the obtained, additional correction value.

In other words, the method according to the invention, as described to this point, is first applied to the camera images from just two cameras. In an additional step, the camera images of these two cameras are rectified using the corrected mapping functions. The camera image from the third camera, conversely, is rectified using the associated, original and not yet corrected mapping function. The rectification occurs respectively for a plurality of parallel reference planes, wherein the correction becomes more precise (although more computationally intensive) the closer the selected reference planes are distributed within the measurement volume. Then, a two-dimensional correlation, preferably a cross-correlation, is performed for each reference plane, however not directly between rectified camera images, as previously described. Rather, the first of the two correlation terms is the arithmetical product of the rectified camera images from the first and second camera, while the second correlation term corresponds to the rectified camera image from the third camera. Therefore, for each reference plane, a correlation field results that represents the correlation between said product from the first and second rectified camera image, on the one hand, and the third rectified camera image, on the other hand. These correlation fields are summed. The result is a sum correlation field that, in the event a cross-correlation is used as a similarity operator, can be written generally in the following form:

$$C_{123}(d_x,d_y)=\Sigma_z\Sigma_{x,y}\{(Ir_{1,z}(X,Y)Ir_{2,z}(X,Y))Ir_{3,z}(X+d_x,Y+d_y)\},$$

where $Ir_{i,z}$ is the camera image rectified in relation to the respective reference plane Z. For simplicity, the example of a reference plane in the Z plane is used again, and the summing along Z is usually done, e.g. with a distance of approximately one pixel (or voxel).

The sum correlation field has a single, unambiguously determinable correlation peak. The distance (dx,dy) of this correlation peak relative to the coordinate origin of the sum correlation field is then determined as an additional correction value. This additional correction value serves to correct the not-yet-corrected mapping function, i.e., that of the third camera. The two previously pre-corrected mapping functions, i.e., the mapping functions of the first and second camera, can undergo an additional correction on the basis of the additional correction value. Correspondingly advantageous correction methods are again known to one skilled in the art.

Of course, the expanded method can also be further improved by means of two-dimensional diversification of the mapping function correction on the basis of interrogation fields. Therefore in a further development of the expanded method, it can be provided that the rectified camera images before Step g are each divided into a plurality of equally sized and equally positioned interrogation fields, Steps g and h are performed on the interrogation fields and the mapping functions in Step i are corrected in the different spatial regions of the measurement associated with the different interrogation fields, namely using the different correction values associated with each. Likewise, the calculations can again be done on various (parallel) reference planes in order to perform differing corrections of the mapping equation for various planes within the measurement volume.

With regard to the effects and advantages of this measure, reference can be made to the above explanation in the context of the non-expanded method according to the invention.

Additional features and advantages of the invention derive from the following specific description and drawings.

BRIEF DESCRIPTION OF DRAWINGS

FIG. 2 is a schematic representation of Steps b, c, d1 and d2 of the method according to the invention, which follow on Step a from FIG. 1.

DETAILED DESCRIPTION

Figure 1:
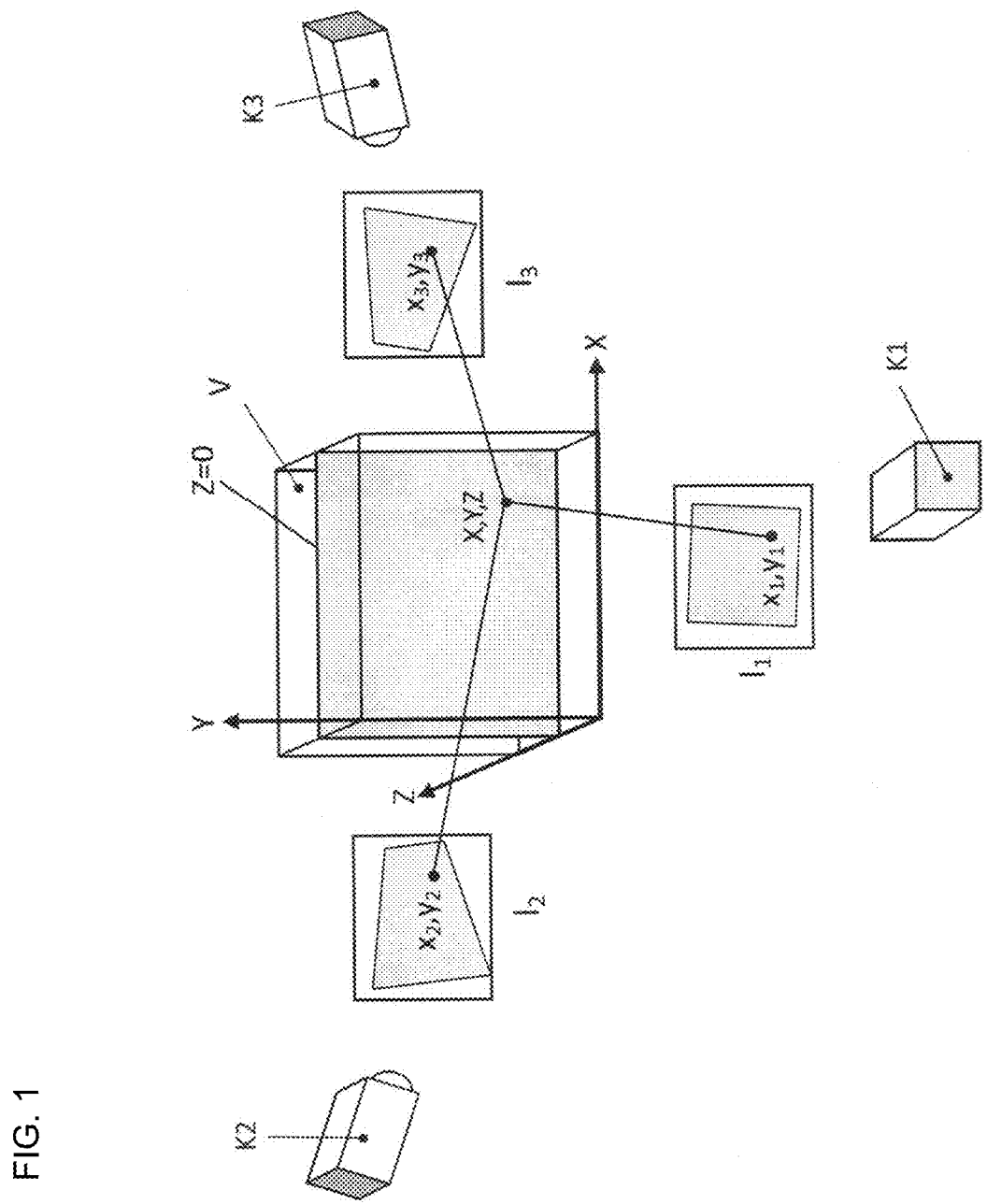
FIG. 1 is a schematic representation of a typical application situation for the method according to the invention, at the same time Step a of the method.

Identical reference symbols in the figures indicate identical or equivalent elements.

In a highly schematic representation, FIG. 1 shows a typical measurement situation in which a calibration according to the invention can be applied.

In the center of the set-up there is a measurement volume V that in the typical application case of a flow measurement contains a flowing fluid that has been seeded with particles. The particles are selected such that they are optically detectable. These can be refractive or fluorescing particles. The lighting and/or detection details required in the specific case are known to one skilled in the art and can be variously applied as is suitable. For the present invention, these details play no role. Moreover, a moving flow is not required either for the calibration method according to the invention.

Each point in the measurement volume V can be identified based on the spatial coordinates X, Y, Z. This applies in particular to the positions of the particles. A reference plane that has been arbitrarily located at Z=0, for example, appears with a gray background in FIG. 1.

In the embodiment shown, the measurement volume V is observed by three cameras K1, K2, K3 from different observation angles. The choice of exactly three cameras should be understood as purely an example. The method according to the invention can be performed with any plurality of cameras.

In Step a (per the nomenclature according to the claims) of the method according to the invention, all three cameras K1, K2, K3 simultaneously take a camera image of the measurement volume. The results are the camera images $I_1$, $I_2$ and $I_3$ shown schematically in FIG. 1. The camera images $I_1$, $I_2$ and $I_3$ show a certain warping that results partially from purely optical characteristics but primarily from their geometric relative positioning to the measurement volume. This is shown in an exaggerated manner in FIG. 1. In the example shown, the camera K1 is positioned exactly perpendicular to the XY plane and oriented toward the center of the measurement volume V. At the same time, it is slightly rotated about its own optical axis. Therefore, the associated camera image $I_1$ shows merely minor perspectively rotated warping. Conversely, cameras K2 and K3 that are oriented toward the XY plane at a pronounced angle produce camera images $I_2$ and $I_3$, which are additionally in perspective geometrically warped, accordingly.

FIG. 2 shows further steps of the method according to the invention that are computer-based and performed in fully automated fashion. This section of the method according to the invention is typically realized in software.

Camera images $I_1$, $I_2$ and $I_3$ form the starting point. In Step b (per the nomenclature according to the claims) of the method according to the invention, a rectification of camera images $I_1$, $I_2$ and $I_3$ takes place, which results in the rectified camera images $Ir_1$, $Ir_2$ and $Ir_3$. The rectification must always take place in relation to a defined plane. It is advantageous within the framework of the method according to the invention to use the previously mentioned reference plane Z=0. As one skilled in the art will recognize, the mapping function to be calibrated is incorporated into the method according to the invention via this rectification step.

In Step c (per the nomenclature according to the claims) of the method according to the invention, a pair-based correlation of the rectified camera images $Ir_1$, $Ir_2$ and $Ir_3$ is performed that results in three correlation fields, of which, for simplicity, only the correlation field $C_{12}$ resulting from the correlation of the rectified camera images $Ir_1$ and $Ir_2$ is shown. In this regard, a light point refers to a high correlation value; a dark point refers to a correspondingly low correlation value.

Against the background of an essentially random distribution of correlation peaks across the entire correlation field area, the correlation fields show a longitudinally extended "band" in which the number of correlation peaks significantly rises.

Then in Step d, as a subsumption of Steps d1 and d2 (per the nomenclature according to the claims) of the method according to the invention, for each correlation peak band a representative straight line as well as its distance from the coordinate origin of the correlation field are determined. Again, for simplicity, only the correlation field $C_{12}$ and the associated line $g_{12}$ are shown. The determination of the representative line $g_{12}$ can be done with usual image processing algorithms.

Furthermore, the distance of the representative straight line from the origin of the respective correlation field is calculated. An associated distance vector results in each case, i.e., in the case of the represented correlation field $C_{12}$, the distance vector $d_{12}$ with its components $d_{12\_x}$ and $d_{12\_y}$ (parallel to the dx and dy coordinate axes, respectively. This vector begins in the respective correlation field origin and is positioned perpendicular to the associated representative straight line.

In the last step of the method according to the invention (Step e per the nomenclature according to the claim), which is not shown in FIG. 2, the distance vectors determined in this manner are then used to correct the mapping functions $M_1$, $M_2$ and $M_3$. One skilled in the art will understand that when more or fewer cameras are used, correspondingly more or fewer correlations must be performed, although the handling of the individual correlation fields proceeds identically to the above-described example and the correction of the mapping functions proceeds correspondingly.

In the case of the "inline" configuration of cameras explained in the general part of the description, the correction according to the invention does result in an improvement of the mapping functions, but not necessarily in their optimization. The above-explained method is therefore only applied to two of the three cameras K1 K2, K3 whose mapping functions are also corrected accordingly.

Of course, the embodiments discussed in the specific description and shown in the Figures are only illustrative exemplary embodiments of the present invention. The present disclosure gives a person skilled in the art a broad spectrum of possible variations to work with.

LIST OF REFERENCE NUMBERS

V measurement volume
X, Y, Z volume coordinates in V
K1, K2, K3 cameras
$I_1$, $I_2$, $I_3$ camera images of K1, K2 and K3

$Ir_1$, $Ir_2$, $Ir_3$ rectified camera images of K1, K2 and K3
x, y area coordinates in $I_1$, $I_2$, $I_3$ and $Ir_1$, $Ir_2$, $Ir_3$
$C_{12}$ correlation field
dx, dy area coordinates in $C_{12}$
$g_{12}$ representative straight line
$d_{12}$ distance from $g_{12}$ (vectorial)

The invention claimed is:

1. A method for calibrating an optical measurement set-up with a measurement volume (V) seeded with particles and with at least two cameras of a plurality of cameras, by means of which the measurement volume (V) can be mapped from different observation angles, in each case with a mapping function known from a pre-calibration, said method comprising:
   a) simultaneously mapping the measurement volume (V) by means of the plurality of cameras to produce a camera image respectively for each of the two cameras,
   b) rectifying camera images in relation to a common reference plane in the measurement volume (V) with use of the associated, pre-calibrated mapping function to obtain rectified camera images,
   c) performing a two-dimensional correlation for at least one pair of the rectified camera images to produce a corresponding number of correlation fields, wherein each correlation field presents an elongate correlation maxima band,
   d) for each correlation field:
      d1) reducing the correlation maxima band to a straight line ($g_{12}$) representative of this band,
      d2) determining a distance ($d_{12}$) of this representative straight line ($g_{12}$) from the coordinate origin of the correlation field as a correction value,
   e) using the determined correction values to correct the mapping functions of those cameras of the plurality of cameras for which rectified camera images were included in the correlations in Step c.

2. The method according to claim 1, wherein:
the rectified camera images before Step c are each divided into a plurality of equally sized and equally positioned interrogation fields, Steps c and d are performed on the interrogation fields and the mapping functions in Step e are corrected in the different spatial regions of the measurement volume (V) with which the different interrogation fields are associated, using the respectively associated, different correction values.

3. The method according to claim 1, wherein:
the method is performed multiple times, at least from Steps b to e, wherein the camera images are rectified during each pass in Step b in relation to another common reference plane and wherein the mapping functions in Step e are each corrected using the respectively determined correction values only in the spatial region of the measurement volume (V) with which the respective reference plane is associated.

4. The method according to claim 1, wherein:
the method is performed from Steps a to c multiple times for multiple points in time, the respectively corresponding correlation fields are summed and then Steps d and e of the method are performed.

5. The method according to claim 1, wherein the plurality of cameras of the optical measurement set-up comprises a first camera (K1), a second camera (K2) and a third camera (K3), of whose rectified camera images only those from the first and second camera (K1, K2) are involved in the correlation and correction of Steps c to e, the method further comprising:
   f) rectification
      of the camera images from the first and second cameras (K1, K2) using the respectively associated mapping function corrected in Step e and
      of a third camera image from the third camera (K3) using the associated, pre-calibrated mapping function in relation to a plurality of common parallel reference planes, g) performing, for each reference plane, a two-dimensional correlation between the product of the rectified camera images from the first and from the second camera (K1, K2) with the rectified camera image 4 from the third camera (K3) and summing the resulting correlation fields to produce a sum correlation field, h) determining the distance of the correlation maximum in the sum correlation field from the coordinate origin of the sum correlation field as an additional correction value, i) correcting the mapping function of the third camera (K3) using the additional correction value that was determined.

6. The method according to claim 5, wherein:
in Step i the mapping functions of the first and/or of the second camera (K1, K2) corrected in Step e are corrected once again using the additional correction value that was determined.

7. The method according to claim 5, wherein:
the rectified camera images before Step g are each divided into a plurality of equally sized and equally positioned interrogation fields, Steps g and h are performed on the interrogation fields and the mapping functions in Step i are corrected in the different spatial regions of the measurement volume (V) associated with the different interrogation fields, using the respectively associated, different correction values.

8. The method according to claim 1, wherein: at least one correlation is performed as a cross-correlation of the general form $$C_{ij}(dx,dy) = \Sigma_{x,y} Ir_i(X,Y) Ir_j(X+dx, Y+dy).$$

* * * * *